(12) United States Patent
Xu

(10) Patent No.: US 11,138,777 B2
(45) Date of Patent: Oct. 5, 2021

(54) MIXED REALITY INTERACTION METHOD, APPARATUS, DEVICE AND STORAGE MEDIUM

(71) Applicant: BAIDU ONLINE NETWORK TECHNOLOGY (BEIJING) CO., LTD., Beijing (CN)

(72) Inventor: Li Xu, Beijing (CN)

(73) Assignee: BAIDU ONLINE NETWORK TECHNOLOGY (BEIJING) CO., LTD. (CN)

( * ) Notice: Subject to any disclaimer, the term of this patent is extended or adjusted under 35 U.S.C. 154(b) by 0 days.

(21) Appl. No.: 16/508,380

(22) Filed: Jul. 11, 2019

(65) Prior Publication Data

US 2020/0043210 A1 Feb. 6, 2020

(30) Foreign Application Priority Data

Aug. 6, 2018 (CN) .......................... 201810887112.1

(51) Int. Cl.
*G06T 19/00* (2011.01)
*G06T 11/60* (2006.01)

(52) U.S. Cl.
CPC .......... *G06T 11/60* (2013.01); *G06T 2200/24* (2013.01)

(58) Field of Classification Search
CPC .................................................. G06T 19/006
See application file for complete search history.

(56) References Cited

U.S. PATENT DOCUMENTS

| 9,996,978 B2* | 6/2018 | Olson ................ G02B 27/0172 |
| 2014/0016825 A1* | 1/2014 | Kasahara ................ G06T 11/00 |
| | | 382/103 |
| 2016/0012644 A1* | 1/2016 | Lam ...................... G06T 19/006 |
| | | 345/419 |
| 2017/0309178 A1* | 10/2017 | Hernandez ............ G08G 1/163 |
| 2018/0262684 A1* | 9/2018 | Lowry .................. G06T 19/006 |
| 2019/0043260 A1* | 2/2019 | Anderson ............... G06F 3/011 |

FOREIGN PATENT DOCUMENTS

| CN | 103366610 A | 10/2013 |
| CN | 106933355 A | 7/2017 |
| CN | 108255194 A | 7/2018 |
| JP | 2017123050 A | 7/2017 |

OTHER PUBLICATIONS

First Office Action in CN Patent Application No. 201810887112.1 dated Feb. 24, 2021.

* cited by examiner

*Primary Examiner* — Yi Yang
(74) *Attorney, Agent, or Firm* — Dilworth IP, LLC

(57) ABSTRACT

The present application provides a mixed reality interaction method, an apparatus, and a storage medium, where the method includes obtaining position information of a real object in space in real time through a positioning chip disposed in the real object, and controlling, according to the position information of the real object, a virtual object in an augmented reality AR scenario to move in the AR scenario according to a moving track of the real object. The technical solution allows an object in the real world and an object in the virtual world seen by a user to be synchronized, thereby improving the user experience.

9 Claims, 3 Drawing Sheets

Obtaining position information of a real object in space in real time through a positioning chip disposed in the real object ⸺ 21

Controlling, according to the position information of the real object, a virtual object in an augmented reality AR scenario to move in the AR scenario according to a moving track of the real object ⸺ 22

MIXED REALITY INTERACTION METHOD, APPARATUS, DEVICE AND STORAGE MEDIUM

CROSS-REFERENCE TO RELATED APPLICATIONS

This application claims priority to Chinese Patent Application No. 2018/10887112.1, filed on Aug. 6, 2018, which is hereby incorporated by reference in its entirety.

TECHNICAL FIELD

The present application relates to the field of computer technologies and, in particular, to a mixed reality interaction method, an apparatus and a storage medium.

BACKGROUND

The mixed reality (MR) technology is a further development of the virtual reality technology. Such technology enhances the sense of reality of user experience by presenting virtual scenario information in a real scenario, building an interactive feedback information loop between the real world, virtual world and user. Since mixed reality may affect workflow and help people to improve work efficiency and innovation ability, mixed reality has a large application scenario.

At present, the imperfection of the mixed reality interaction may cause the object in a real-world object to be out of sync in a virtual world, resulting in poor user experience.

SUMMARY

The present application provides a mixed reality interaction method, apparatus and storage medium to solve the problem of poor user experience as a result that the imperfection of the mixed reality interaction may cause the real-world object to be out of sync in the virtual world.

A first aspect of the present application provides a mixed reality interaction method, including:
obtaining position information of a real object in space in real time through a positioning chip disposed in the real object;
controlling, according to the position information of the real object, a virtual object in an augmented reality (AR) scenario to move in the AR scenario according to a moving track of the real object.

In an embodiment, in a possible implementation form of the first aspect, the method further includes:
obtaining an identifier of the real object;
binding the real object to the virtual object according to the identifier of the real object.

In an embodiment, in the above possible implementation form of the first aspect, the obtaining an identifier of the real object includes:
receiving an object binding request inputted by a user; the object binding request includes the identifier of the real object, and the object binding request is used to indicate to bind the real object to the virtual object.

In an embodiment, in another possible implementation form of the first aspect, the obtaining position information of a real object in space in real time through a positioning chip disposed in the real object, includes:
receiving the position information of the real object in the space sent by the positioning chip via ultra-wideband (UWB) technology in real time; the position information includes three-dimensional coordinates of the real object.

In an embodiment, in still another possible implementation form of the first aspect, the controlling, according to the position information of the real object, a virtual object in an augmented reality (AR) scenario to move in the AR scenario according to a moving track of the real object includes:
displaying in superposition the virtual object on a corresponding position in the AR scenario according to position information of the real object;
controlling the virtual object to move to a target position in the AR scenario after the position information of the real object is updated, where the target position is a corresponding position of the updated position information of the real object in the AR scenario.

A second aspect of the present application provides a mixed reality interaction apparatus, including an obtaining module and a controlling module;
the obtaining module is configured to obtain position information of a real object in space in real time through a positioning chip disposed in the real object;
the controlling module is configured to control, according to the position information of the real object, a virtual object in an augmented reality AR scenario to move in the AR scenario according to a moving track of the real object.

In an embodiment, in a possible implementation form of the second aspect, the obtaining module is further configured to obtain an identifier of the real object;
correspondingly, the controlling module is further configured to bind the real object to the virtual object according to the identifier of the real object.

In an embodiment, in the above possible implementation form of the second aspect, the obtaining module is further configured to receive an object binding request inputted by a user; the object binding request includes the identifier of the real object, and the object binding request is used to indicate to bind the real object to the virtual object.

In an embodiment, in another possible implementation form of the second aspect, the obtaining module is specifically configured to receive the position information of the real object in the space sent by the positioning chip via ultra-wideband UWB technology in real time; the position information includes three-dimensional coordinates of the real object.

In an embodiment, in still another possible implementation form of the second aspect, the controlling module is specifically configured to display in superposition the virtual object on a corresponding position in the AR scenario according to the position information of the real object, and control the virtual object to move to a target position in the AR scenario after update of the position information of the real object, where the target position is a corresponding position of the updated position information of the real object in the AR scenario.

A third aspect of the present application provides a mixed reality interaction apparatus, including a processor, a memory, and a computer program stored on the memory and executable on the processor, and the processor implement any one of method according to each possible implementation form of the first aspect and to the first aspect as such when executes the program.

A fourth aspect of the present application provides a storage medium having an instruction stored therein, when the instruction runs on a computer, the computer is caused to implement any one of method according to each possible implementation form of the first aspect and to the first aspect as such.

The mixed reality interaction method, apparatus and storage medium provided in embodiments of the present application obtains position information of a real object in space in real time through a positioning chip disposed in the real object, and then control, according to the position information of the real object, a virtual object in an augmented reality AR scenario to move in the AR scenario according to a moving track of the real object. Such technical solution synchronizes the object in the real world and the object in the virtual world seen by a user, thereby improving the user experience.

DESCRIPTION OF EMBODIMENTS

To make the objectives, technical solutions, and advantages of embodiments of the present application clearer, the technical solutions in the embodiments of the present application are clearly and comprehensively described below with reference to the accompanying drawings in the embodiments of the present application. Apparently, the described embodiments are merely a part rather than all embodiments of the present application. All other embodiments obtained by persons of ordinary skill in the art based on embodiments of the present application without creative effort shall fall within the scope of the present application.

Figures 1, 2:
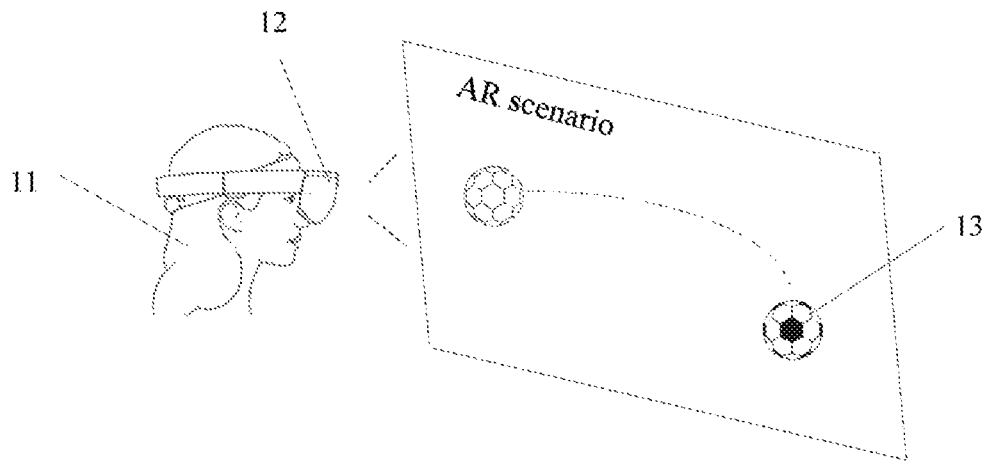
FIG. 1 is a schematic structural diagram of a mixed reality interaction system according to an embodiment of the present application.
FIG. 2 is a schematic flowchart of Embodiment I of a mixed reality interaction method according to an embodiment of the present application.

The mixed reality interaction method provided by embodiments of the present application is applied to the mixed reality interaction system. FIG. 1 is a schematic structural diagram of a mixed reality interaction system according to an embodiment of the present application. As shown in FIG. 1, the mixed reality interaction system includes a user 11, an AR device 12 worn by the user, and a virtual sphere 13 of a real sphere (not shown) in an augmented reality (AR) scenario.

In an embodiment, a positioning chip is disposed in the real sphere, and position information of the real sphere in space may be positioned by the positioning chip. The AR device 12 worn by the user has a controller, and the controller may obtain the position information of the real sphere through the positioning chip, and then control the movement of the virtual sphere 13 in the AR scenario according to the position information.

In an embodiment, the augmented reality (AR) technology is a technology that increases user perception of the real world by information provided by a computer system, applying virtual information to the real world, and superimposing a virtual object, scenario, or system prompt information generated by computer to a real scenario, thereby achieving an enhancement to reality.

Mixed reality (MR) may include augmented reality and augmented virtual, referring to a new visual environment generated by combining the real world and the virtual world. In the new visual environment, physical and digital objects coexist and interact in real time. The mixed reality is proposed based on the rise of virtual reality (VR) and AR, it may be considered as an enhanced version of AR, mainly used in the direction of wearable devices.

Embodiments of the present application, directed to the problem of poor user interaction experience in the existing mixed reality interaction mode, provide a mixed reality interaction method, by controlling, according to the position information of the real object, a virtual object in an augmented reality (AR) scenario to move in the AR scenario according to a moving track of the real object, improving the user's interactive in the mixed reality combining the virtual and reality.

Technical solutions of the present application will be described in detail through specific embodiments using a mixed reality interaction system shown in FIG. 1. It should be noted that the following specific embodiments may be combined with each other, and the same or similar concepts or processes may not be described again in some embodiments.

In the embodiments of the present application, "a plurality" means two or more. "and/or" describes the association relationship of associated objects, indicating that there may be three relationships, for example, A and/or B may indicate that there are three cases where A exists separately, A and B exist at the same time, and B exists separately. The character "/" generally indicates that contextual objects are in a relationship of "or".

FIG. 2 is a schematic flowchart of Embodiment I of a mixed reality interaction method according to an embodiment of the present application. An executor of the method embodiment may be a controller or a server, optionally, the embodiments of the present application are described by taking the executor as the controller. As shown in FIG. 2, a mixed reality interaction method provided by an embodiment of the present application may include the following steps:

Step 21: obtaining position information of a real object in space in real time through a positioning chip disposed in the real object.

In an embodiment, in embodiments of the present application, the positioning chip may be disposed in the real object in the real world, and the positioning chip may wireless communicate with a controller disposed in an AR device. Specifically, the positioning chip may send a positioning signal in real time. Therefore, the controller may obtain the positioning signal in real time; determine position information of the positioning chip according to the obtained positioning signal, thereby obtaining position information of the real object in real time.

In an embodiment, the positioning chip may be a global positioning system (GPS) chip or a tracking chip. In general, the positioning chip includes a radio frequency (RF) chip, a baseband chip and a microprocessor chipset; the chipset may realize accurate positioning of the chip and lay a foundation for accurately positioning the position information of the real object.

In an embodiment, as an example, the step 21 (obtaining position information of a real object in space in real time through a positioning chip disposed in the real object) may be specifically implemented as follows:

receiving the position information of the real object in the space sent by the positioning chip via ultra-wideband UWB technology in real time; where the position information includes three-dimensional coordinates of the real object.

In an embodiment, the ultra wideband (UWB) technology is a carrier-free communication technology using nanosecond to microsecond non-sinusoidal narrow pulses to transmit data, which is a revolutionary advancement in the radio field, and it is believed to be a mainstream technology for short-range wireless communication in the future. UWB was used in the early days for close-range high speed data transmission. In recent years, foreign countries have begun to use their sub-nanosecond ultra-narrow pulses for close-range accurate indoor positioning.

In embodiments of the present application, the positioning chip may send (or broadcast) its own position information to a surrounding space by using the UWB technology, that is, send the position information of the real object in the space, and thus, the controller in the AR device, according to the obtained position information sent by the positioning chip using the UWB technology, determines the position information of the real object in the space. In an embodiment, the position information in the space is represented by three-dimensional coordinates. Therefore, the position information of the real object in the space obtained by the controller includes three-dimensional coordinates of the real object.

Step 22, controlling, according to the position information of the real object, a virtual object in an augmented reality AR scenario to move in the AR scenario according to a moving track of the real object.

In an embodiment, the augmented reality (AR) technology is a new technology that "seamlessly" integrates real world information and virtual world information, and it is to analog, simulate and then superimpose the entity information (visual information, sound, taste, touch, etc.) difficult to experience in a certain time and space within the real world by means of science and technology like computer, to apply virtual information to the real world and be perceived by human senses, thereby achieving a sensory experience beyond reality. A real environment and a virtual object are superimposed on a same picture or space to coexist in real time.

In embodiments of the present application, the virtual object in the AR scenario may be made to move, by the controller, in the AR scenario according to the moving track of the real object, thereby improving the user's interaction experience in mixed reality.

A mixed reality interaction method of embodiments of the present application, mainly by firstly positioning position information of a real object, and secondly combining the AR technology, binds the real object to a virtual object in an AR scenario, thereby realizing a mixed reality interaction experience combining the virtual and reality.

For example, regarding a real sphere in the real world, firstly positioning position information of the real sphere in a three-dimensional space using a positioning chip disposed in the real sphere, and then bind the real sphere to a virtual sphere in a AR scenario, that is, control the virtual sphere to move in space according to the position information of the real sphere, realize the effect of synchronous movement of the real sphere and the virtual sphere, so that a user may operate the real sphere on a virtual AR court by wearing a pair of AR glasses.

The mixed reality interaction method provided by embodiments of the present application, obtains position information of a real object in space in real time through a positioning chip disposed in the real object, and then controls, according to the position information of the real object, a virtual object in an AR scenario to move in the AR scenario according to a moving track of the real object. The technical solution allows an object in the real world and an object in the virtual world seen by a user to be synchronized, thereby improving the user experience.

Figure 3:
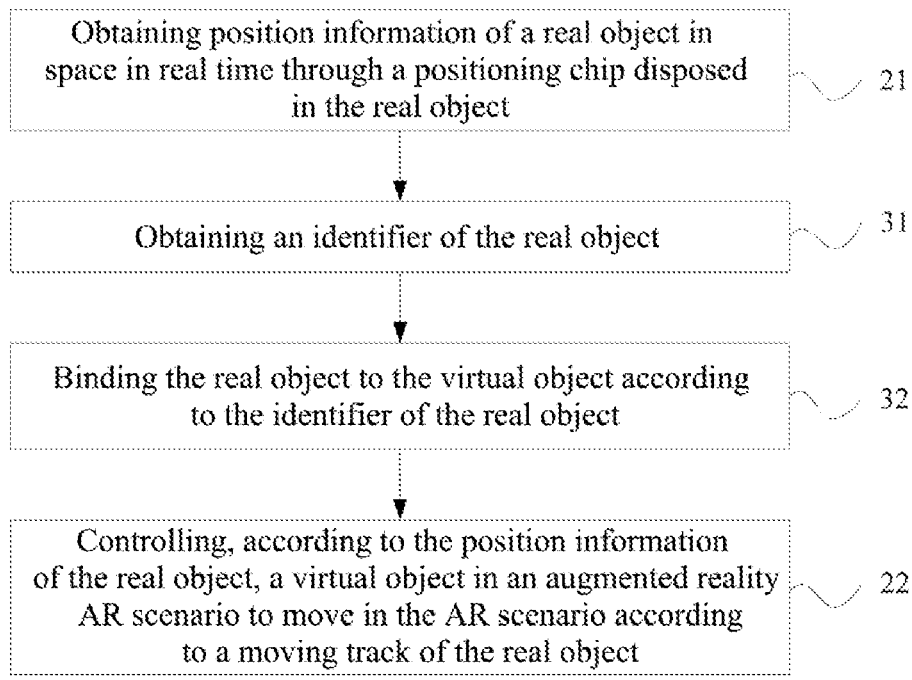
FIG. 3 is a schematic flowchart of a mixed reality interaction method Embodiment II according to an embodiment of the present application.

In an embodiment, based on the above embodiments, FIG. 3 is a schematic flowchart of a mixed reality interaction method Embodiment II according to an embodiment of the present application. As shown in FIG. 3, the mixed reality interaction method provided in the embodiment may further include the following steps:

Step 31, obtaining an identifier of the above real object.

In an embodiment, in embodiments of the present application, when the positioning chip is disposed in the real object, the identifier of the real object may be written into the corresponding positioning chip by means of a software implementation, and then when the positioning chip sends the position information (i.e. the position information of the real object), the identifier of the real object is also sent, so as to allow the controller to accurately control the movement of the virtual object in the AR scenario according to the received position information and the identifier of the real object.

In an embodiment, in embodiments of the present application, as an example, the controller obtaining the identifier of the real object may be specifically implemented by:

receiving an object binding request inputted by a user; the object binding request includes the identifier of the real object, and the object binding request is used to indicate to bind the real object to the virtual object.

In an embodiment, when the user wants to experience MA and control the virtual object to move in the AR scenario, the real object and the virtual object need to be bound together first, so the user may send object binding request to the controller, to make the controller to bind the objects according to the indication of the object binding request. In addition, since the real world includes many objects, in order to make the controller to determine the real object to be operated by the user, that is, the real object to be bound by the controller, the object binding request also needs to include the identifier of the real object, thereby realizing the binding of the real object to the virtual object according to the identifier of the real object.

Step 32, binding the real object to the virtual object according to the identifier of the real object.

In an embodiment, since the above object binding request is used to indicate to bind the real object to the virtual object, the controller, after obtaining the identifier of the real object from the received object binding request, may bind the real object to the virtual object according to the indication of the object binding request.

It should be noted that step 31 and step 32 in embodiments of the present application may be performed after the above step 21 and before the step 22, as shown in FIG. 3, after the controller obtains the position information of the real object in the space in real time by the positioning chip disposed in the real object, the controller first obtains the identifier of the real object, binds the real object to the virtual object according to the identifier of the real object, and controls, according to the position information of the real object, the virtual object in the AR scenario to move in the AR scenario according to the moving track of the real object.

The mixed reality interaction method provided by embodiments of the present application may bind, after obtaining the identifier of the real object, the real object to the virtual object according to the identifier of the real object, which provides an implementation possibility for the controller to control subsequently, according to the position information of the real object, the virtual object in the AR scenario to move in the AR scenario according to the moving track of the real object.

Figure 4:
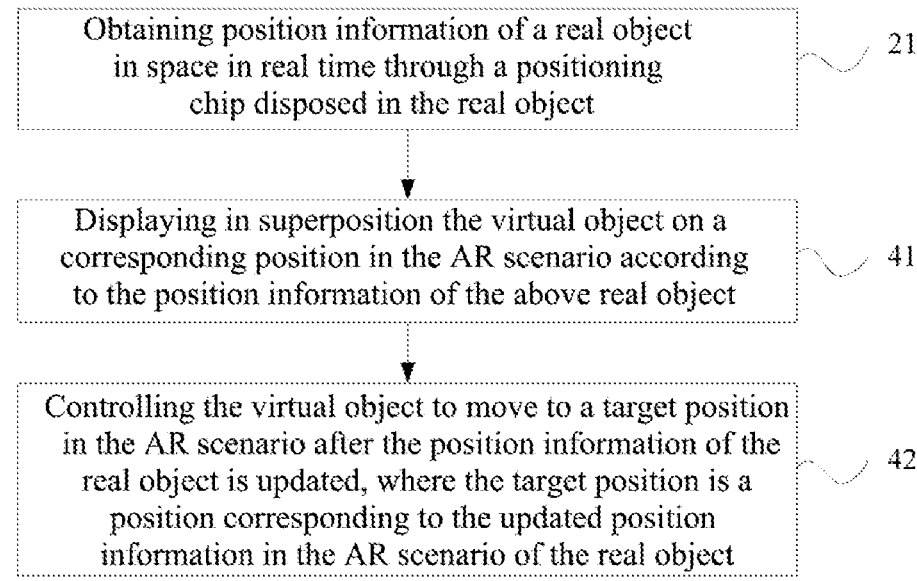
FIG. 4 is a schematic flowchart of a mixed reality interaction method Embodiment III according to an embodiment of the present application.

In an embodiment, based on any one of the above embodiments, FIG. 4 is a schematic flowchart of a mixed reality interaction method Embodiment III according to an embodiment of the present application. As shown in FIG. 4, in the mixed reality interaction method provided by the embodiment of the present application, the above step 22 (controlling, according to the position information of the real object, the virtual object in the augmented reality AR scenario to move in the AR scenario according to the moving track of the real object) may be achieved by the following steps:

Step 41, displaying in superposition the virtual object on a corresponding position in the AR scenario according to the position information of the real object.

In an embodiment, in embodiments of the present application, after a user wears a AR device (AR glasses), the real object in the real world is mapped into a virtual object in the AR scenario, and if the virtual object in the AR scenario is to be controlled to move in the AR scenario according to the moving track of the real object, the controller first displays in superstition the virtual object on a corresponding position in the AR scenario according to the obtained position information of the real object in real time, allowing the position of the virtual object and the position of the real object in the real world seen by the user through the AR device being the same.

Step 42, controlling the virtual object to move to a target position in the AR scenario after the position information of the real object is updated, where the target position is a position corresponding to the updated position information of the real object in the AR scenario.

In an embodiment, when the real object in the real world moves, its virtual object in the AR scenario should also move accordingly. Since the controller may obtain the position information of the real object in real time according to the positioning chip disposed in the real object, the controller may also obtain the position information of the real object after the movement when the real object moves, thus, once the controller determines that the position information of the real object is updated, the controller may control the position information of the virtual object in the AR scenario to be updated accordingly.

Specifically, when the controller determines that the position information of the real object changes, the controller may control the position information of the virtual object in the AR scenario to change correspondingly, that is, control the virtual object to move to the target position in the AR scenario, where the target position is the position corresponding to the updated position information of the real object in the AR scenario.

The mixed reality interaction method provided by embodiments of the present application displays in superposition the virtual object on the corresponding position in the AR scenario according to the position information of the real object, and then controls the virtual object to move to the target position in the AR scenario after the position information of the real object is updated, where the target position is the position corresponding to the updated position information of the real object in the AR scenario, thereby achieving the purpose of controlling, according to the position information of the real object, the virtual object in the AR scenario to move in the AR scenario according to the moving track of the real object. The virtual object in the technical solution may move in the AR scenario according to the moving track of the real object, achieving movement synchronization of the real object and the virtual object, and improving the user's interactive experience in mixed reality.

The followings are apparatus embodiments of the present application, which may be used to implement the method embodiments according to embodiments of the present application. For details not disclosed in apparatus embodiments according to embodiments of the present application, please refer to method embodiments of the present application.

Figure 5:
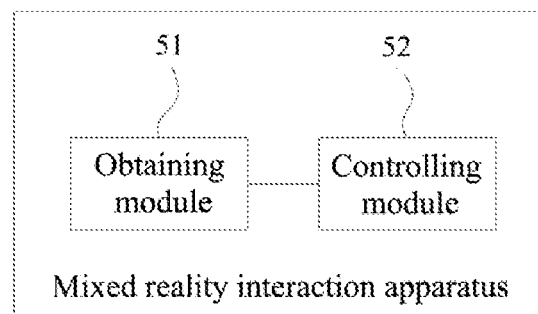
FIG. 5 is a schematic structural diagram of a mixed reality interaction apparatus Embodiment I according to an embodiment of the present application.

FIG. 5 is a schematic structural diagram of a mixed reality interaction apparatus Embodiment I according to an embodiment of the present application. As shown in FIG. 5, the mixed reality interaction apparatus provided by the embodiment of the present application may include: an obtaining module 51 and a controlling module 52.

Where the obtaining module 51 is configured to obtain position information of a real object in space in real time through a positioning chip disposed in the real object;

the controlling module 52 is configured to control, according to the position information of the real object, a virtual object in an augmented reality AR scenario to move in the AR scenario according to a moving track of the real object.

In an embodiment, in a possible implementation form of embodiments of the present application, the obtaining module 51 is further configured to obtain an identifier of the real object;

correspondingly, the controlling module 52 is further configured to bind the real object to the virtual object according to the identifier of the real object.

In an embodiment, in the above possible implementation form of embodiments of the present application, the obtaining module 51 is further configured to receive an object binding request inputted by a user; the object binding request comprises the identifier of the real object, and the object binding request is used to indicate to bind the real object to the virtual object.

In an embodiment, in another possible implementation form of embodiments of the present application, the obtaining module 51 is specifically configured to receive the position information of the real object in the space sent by the positioning chip via ultra-wideband UWB technology in real time; the position information includes three-dimensional coordinates of the real object.

In an embodiment, in a further possible implementation form of embodiments of the present application, the controlling module 52 is specifically configured to display in superposition the virtual object on a corresponding position in the AR scenario according to the position information of the real object, and control the virtual object to move to a target position in the AR scenario after the position information of the real object is updated, where the target position is a position corresponding to the updated position information of the real object in the AR scenario.

The mixed reality interaction apparatus provided by embodiments of the present application may be used to implement the methods in the embodiments shown in FIG. 2 to FIG. 4, and the implementation principle and technical effects thereof are similar, which will not be repeated herein.

It should be noted that the division of each module of the above apparatus is only a division of logical functions, and may be integrated into one physical entity or be physically separated in whole or in part during actual implementation. And these modules may all be implemented by software in the form of processing component calling; or all of them may be implemented in the form of hardware; some modules may also be implemented in the form of processing component calling software, and some modules are implemented in the form of hardware. For example, a determining module may be a separate processing element, or may be implemented by being integrated in one chip of the above apparatus; moreover, it may be stored in a memory of the above apparatus in the form of a program code, and be called by a processing element of the above apparatus and perform functions of above determining module. Other modules are implemented in a similar way. In addition, all or part of these modules may be integrated together or be implemented independently. The processing element described herein may be an integrated circuit having a capability of signal processing. During implementation, each step or each of the above modules of the above methods may be completed by an integrated logic circuit of hardware in a processor element or an instruction in the form of software.

For example, the above modules may be configured to implement one or more integrated circuits of the above methods, such as one or more application specific integrated circuits (ASIC), or one or more digital signal processors (DSP), or one or more field programmable gate arrays (FPGA). As another example, when one of the above modules is implemented in the form of a processing component calling the program code, the processing component may be a general purpose processor, such as a central processing unit (CPU) or other processors that can call the program code. As another example, these modules may be integrated together and implemented in the form of system-on-a-chip (SOC).

In the above embodiments, it may be implemented in whole or in part by software, hardware, firmware, or any combination thereof. When software prevails, it may be implemented in whole or in part in the form of a computer program product. The computer program product includes one or more computer instructions. When the computer program instruction is loaded and executed on a computer, the processes or functions described according to embodiments of the present application are generated in whole or in part. The computer may be a general purpose computer, a special purpose computer, a computer network, or other programmable apparatus. The computer instruction may be stored in a computer readable storage medium or transferred from one computer readable storage medium to another computer readable storage medium, for example, the computer instruction may be transferred from a website site, a computer, a server or a data center to another website site, computer, server, or data center in a wire (e.g. coaxial cable, fiber optic, digital subscriber line (DSL)), or wireless (e.g. infrared, wireless, microwave, etc.) form. The computer readable storage medium may be any available medium that may be accessed by a computer, or an integrated data storage device (such as a server and a data center,) including one or more available media. The available medium may be a magnetic medium (e.g. a floppy disk, a hard disk, a magnetic tape), an optical medium (e.g. a DVD), or a semiconductor medium (e.g. a solid state disk (SSD)) or the like.

Figure 6:
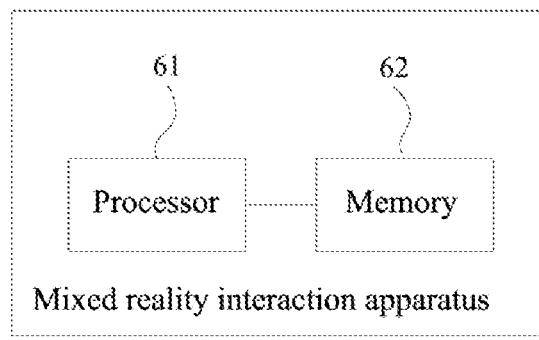
FIG. 6 is a schematic structural diagram of a mixed reality interaction apparatus Embodiment II according to an embodiment of the present application.

FIG. 6 is a schematic structural diagram of a mixed reality interaction apparatus Embodiment II according to embodiments of the present application. As shown in FIG. 6, the mixed reality interaction apparatus may include a processor 61, a memory 62, and a computer program which is stored on the memory 62 and can be run on the processor 61, the processor 61 implements the methods according to the embodiments shown in above FIGS. 2 to 4 when it executes the program.

In an embodiment, embodiments of the present application further provide a storage medium having an instruction stored therein, and when the instruction is run on a computer, the computer is caused to implement methods according to the above embodiments shown in FIGS. 2 to 4 are performed by the computer.

In an embodiment, embodiments of the present application further provide a chip for running an instruction, and the chip is used to perform the methods according to the above embodiments shown in FIGS. 2 to 4.

Embodiments of the present application further provide a program product including a computer program, where the computer program is stored in a storage medium, at least one processor can read the computer program from the storage medium, and the at least one processor may implement the methods of embodiments shown in FIGS. 2 to 4 when it executes the computer program.

It is to be understood that various numerical numbers involved in embodiments of the present application are for the convenience of description only and are not intended to limit the scope of embodiments of the application.

It is to be understood that in embodiments of the present application, the sequence number of the above processes do not indicate the order of execution, and the execution order of each process should be determined by its function and internal logic, and should not constitute any limitation to the implementation process of embodiments of the application.

Finally, it should be noted that the foregoing embodiments shall only be used to describe the technical solution of the present disclosure other than limiting the present disclosure. Although the present disclosure is described in detail with reference to the foregoing embodiments, those of ordinary skill in the art will appreciate that: they may still make modifications to the technical solutions described in the foregoing embodiments or make equivalent substitutions to some or all technical features thereof, such modifications or substitutions shall not depart the essence of the corresponding technical solutions from the scope of the technical solutions of embodiments of the present application.

What is claimed is:

1. A mixed reality interaction method, comprising:
    obtaining position information of a real object in space in real time through a positioning chip disposed in the real object, wherein the space where a user currently is is not a space that the user needs to operate the real object therein to obtain a sensual experience;
    mapping the real object into a virtual object in an augmented reality (AR) scenario according to the position information of the real object, and displaying in superposition the virtual object on a corresponding position in the AR scenario according to the position information of the real object, allowing a position of the virtual object and a position of the real object in a real world seen by the user through an AR device being the same;
    obtaining an identifier of the real object;
    binding the real object to the virtual object according to the identifier of the real object;
    controlling, according to the position information of the real object and the identifier of the real object, the virtual object to move synchronously in the AR scenario according to a moving track of the real object, allowing the user to obtain the sensual experience of operating the real object in the AR scenario displayed with the virtual object when the user wears the AR device and operates the real object in the space;

wherein the obtaining an identifier of the real object comprises:

receiving an object binding request inputted by the user; the object binding request comprises the identifier of the real object, and the object binding request is used to indicate to bind the real object to the virtual object;

wherein the obtaining position information of a real object in space in real time through a positioning chip disposed in the real object comprises:

receiving the position information of the real object in the space sent by the positioning chip via ultra-wideband (UWB) technology in real time, the position information comprises three-dimensional coordinates of the real object.

2. The method according to claim 1, wherein the controlling, according to the position information of the real object and the identifier of the real object, the virtual object to move synchronously in the AR scenario according to a moving track of the real object comprises:

controlling the virtual object to move to a target position in the AR scenario after the position information of the real object is updated, wherein the target position is a position corresponding to the updated position information of the real object in the AR scenario.

3. The method according to claim 1, wherein the real object comprises a sphere, and the AR scenario comprises a virtual AR court.

4. A mixed reality interaction apparatus, comprising a processor and a memory storing instructions thereon, the processor when executing the instructions, being configured to:

obtain position information of a real object in space in real time through a positioning chip disposed in the real object, wherein the space where a user currently is is not a space that the user needs to operate the real object therein to obtain a sensual experience;

map the real object into a virtual object in an augmented reality (AR) scenario according to the position information of the real object, and display in superposition the virtual object on a corresponding position in the AR scenario according to the position information of the real object, allowing a position of the virtual object and a position of the real object in a real world seen by the user through an AR device being the same;

obtain an identifier of the real object;

bind the real object to the virtual object according to the identifier of the real object;

control, according to the position information of the real object and the identifier of the real object, the virtual object to move synchronously in the AR scenario according to a moving track of the real object, allowing the user to obtain the sensual experience of operating the real object in the AR scenario displayed with the virtual object when the user wears the AR device and operates the real object in the space;

wherein the processor is further configured to receive an object binding request inputted by the user, the object binding request comprises the identifier of the real object, and the object binding request is used to indicate to bind the real object to the virtual object;

wherein the processor is configured to receive the position information of the real object in the space sent by the positioning chip via ultra-wideband (UWB) technology in real time; the position information comprises three-dimensional coordinates of the real object.

5. The apparatus according to claim 4, wherein the processor is configured to control the virtual object to move to a target position in the AR scenario after update of the position information of the real object, where the target position is a corresponding position of the updated position information of the real object in the AR scenario.

6. The apparatus according to claim 4, wherein the real object comprises a sphere, and the AR scenario comprises a virtual AR court.

7. A non-transitory storage medium, wherein an instruction is stored therein, when the instruction is run on a computer, the computer is caused to implement the steps of:

obtaining position information of a real object in space in real time through a positioning chip disposed in the real object, wherein the space where a user currently is is not a space that the user needs to operate the real object therein to obtain a sensual experience;

mapping the real object into a virtual object in an augmented reality (AR) scenario according to the position information of the real object, and displaying in superposition the virtual object on a corresponding position in the AR scenario according to the position information of the real object, allowing a position of the virtual object and a position of the real object in a real world seen by the user through an AR device being the same;

obtaining an identifier of the real object;

binding the real object to the virtual object according to the identifier of the real object;

controlling, according to the position information of the real object and the identifier of the real object, the virtual object to move synchronously in the AR scenario according to a moving track of the real object, allowing the user to obtain the sensual experience of operating the real object in the AR scenario displayed with the virtual object when the user wears the AR device and operates the real object in the space;

wherein the non-transitory storage medium further comprises an instruction, when the instruction is run on the computer, the computer is caused to implement the step of:

receiving an object binding request inputted by the user, the object binding request comprises the identifier of the real object, and the object binding request is used to indicate to bind the real object to the virtual object;

wherein the non-transitory storage medium further comprises an instruction, when the instruction is run on a computer, the computer is caused to implement the step of:

receiving the position information of the real object in the space sent by the positioning chip via ultra-wideband (UWB) technology in real time; the position information comprises three-dimensional coordinates of the real object.

8. The non-transitory storage medium according to claim 7, wherein the non-transitory storage medium further comprises an instruction, when the instruction is run on a computer, the computer is caused to implement the step of:

controlling the virtual object to move to a target position in the AR scenario after update of the position information of the real object, where the target position is a corresponding position of the updated position information of the real object in the AR scenario.

9. The non-transitory storage medium according to claim 7, wherein the real object comprises a sphere, and the AR scenario comprises a virtual AR court.

* * * * *